R. H. BOWEN.
PULLEY.
APPLICATION FILED MAR. 3, 1911.
1,044,340.
Patented Nov. 12, 1912.
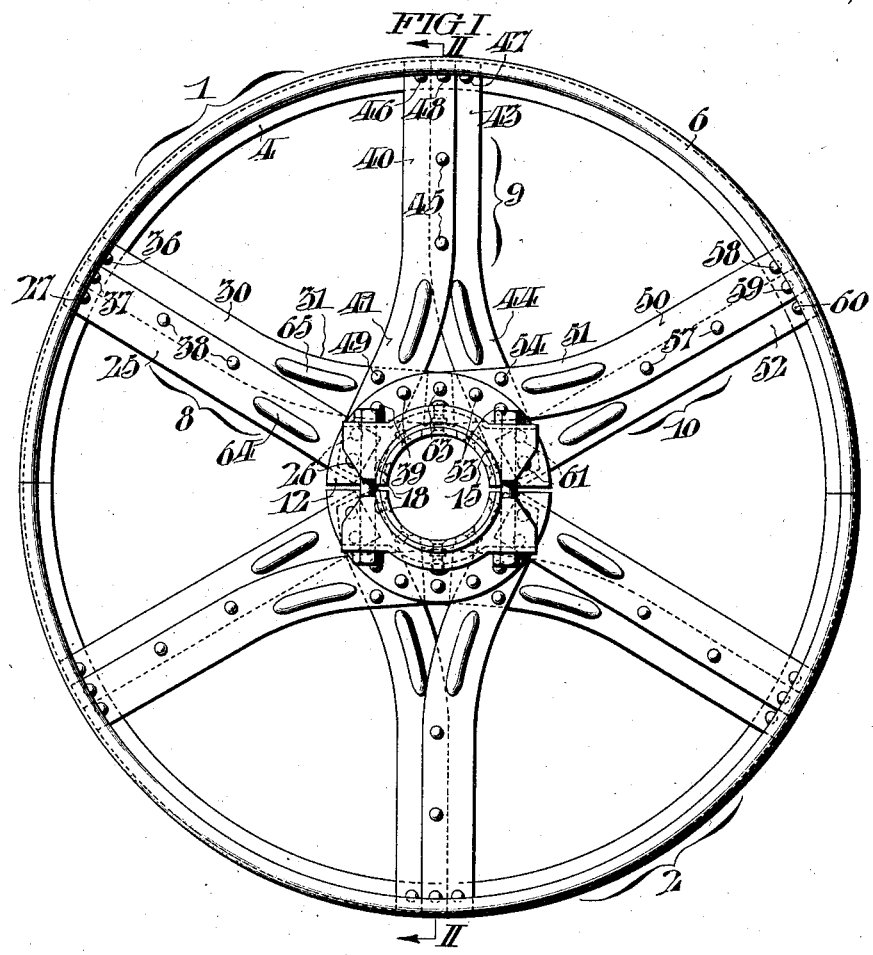
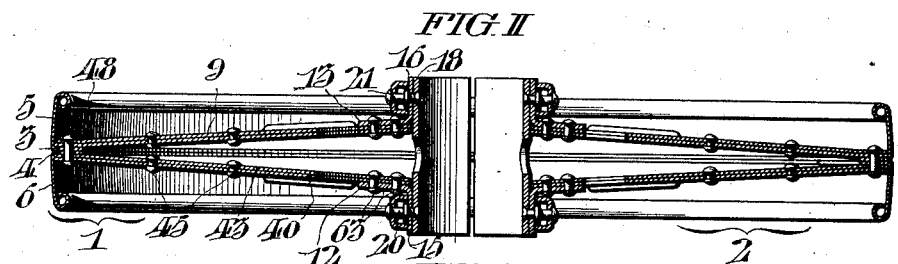
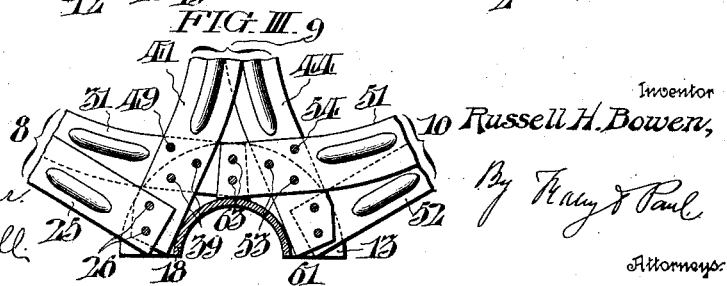
Inventor
Russell H. Bowen,

UNITED STATES PATENT OFFICE.

RUSSELL H. BOWEN, OF PALMYRA, NEW JERSEY, ASSIGNOR TO THE AMERICAN PULLEY COMPANY, OF PHILADELPHIA, PENNSYLVANIA, A CORPORATION OF PENNSYLVANIA.

PULLEY.

1,044,340.  Specification of Letters Patent.  Patented Nov. 12, 1912.

Application filed March 3, 1911. Serial No. 612,077.

*To all whom it may concern:*

Be it known that I, RUSSELL H. BOWEN, of Palmyra, in the county of Burlington and State of New Jersey, have invented certain new and useful Improvements in Pulleys and Similar Structures, whereof the following is a specification, reference being had to the accompanying drawings.

In using the term "pulley" as a convenient general designation for the subject matter of my invention, I do not wish to be understood as limiting my claims to that specific embodiment, since the invention is applicable to any structure of wheel form comprising a hub and spokes. I shall therefore use the term "wheel" in my claims, as comprehending such structures broadly, although the particular description about to be given relates to a pulley.

In Letters Patent of the United States No. 774,347, granted to me under date of November 8th, 1904, I have described a pulley, in which the relation of the spokes to the hub resembles in some respects that of my present improvements. The present invention, however, differs therefrom in certain advantageous particulars about to be described, and affords a highly economical method of construction.

In the accompanying drawings, I have shown the invention as applied to a "split pulley", but it will, of course, be understood that it is not limited to such a two part structure.

Figure I, represents a side elevation of a pulley, embodying my invention. Fig. II, is a transverse section on the lines II, II, and, Fig. III, is a partial sectional view, indicating the details of the application of the inner ends of the spokes to the hub.

Referring to Fig. I, the two halves of the pulley are indicated at 1, and 2, respectively, and as they are similar in construction, a detailed description of one will suffice. The rim of the half-pulley may be formed in the ordinary manner of a pair of sheet metal semi-circular segments 5, and 6, respectively, united by means of rivets passing through the flanges 3, and 4, at their meeting edges, the outer ends of the spokes about to be described being conveniently riveted to said flanges as shown. Three spokes, such as 8, 9, and 10, respectively, are represented as comprised in each half of the pulley. As will be seen by reference to the sectional view of Fig. II, each of the spokes indicated comprehensively by the above numerals, comprises a pair of similar composite spoke-members, whose outer ends converge toward the region where they are secured to the flanges 3, and 4, but whose inner ends diverge toward the regions where they are attached to approximately radial flanges 12, and 13, respectively, formed integrally with the semi-circular bands 15, and 16, respectively, which embrace and are secured upon the outer face of the semi-cylindrical hub shell 18, by means of the counter-sunk rivets 20, and 21.

Referring now to Fig. I, the structure of the composite spoke-members which are nearest the observer will now be described, it being understood that each of the correlated spoke-members which are remote from the observer in Fig. I, and which are shown at the upper side in Fig. II, is preferably similar in construction to its fellow. It will also be noted that for the embodiment of the invention in a "split-pulley", each half of the pulley is preferably provided with three spokes, two of which terminate at points adjacent to the diametrical division of the hub member, while the third spoke is symmetrically arranged between them. In this instance, the two spokes which are nearest to the plane of diametrical division of the hub member differ somewhat from the intermediate spoke in the details of construction of the inner ends. Referring to the intermediate spoke 9, the member thereof which is nearest to the observer in Fig. I, comprises the piece 40, having a straight portion and curved inner end 41, and the piece 43, having a straight portion and oppositely curved inner end 44, said pieces partly overlapping longitudinally along their straight portions, as shown, and being secured together by means of the rivets 45. It will be noted that said pieces lie wholly in different planes, and that by reason of this difference and of a similar difference in the remaining spoke members, the overlapping arrangement of the inner ends of the pieces at the region of their attachment to the hub is attained without bending the several pieces out of their respective planes. At their outer ends, said pieces are secured to the flanges 3, and 4, by rivets 46, 47, and 48. The curved inner end portions 41, and 44, respectively, which are arranged in the bifurcated position, as shown, are preferably prolonged, so as to extend practically to the respective diametrical boundaries of the flange 12, and are secured to said flange by means of rivets, such as 26—39, and 53—61, respectively, which rivets, however, as will hereinafter appear, also serve as securing means for the inner ends of adjacent spokes, which overlap or are overlapped by the parts 41, and 44, respectively.

The spoke 8, comprises a straight strip 25, secured at its outer extremity to the flanges 3, and 4, by means of rivets 27, and 37, and at its inner extremity to the flange 12, of the band 15, by means of the rivets 26, before referred to. As will be seen by reference to Fig. III, the inner end of the strip 25, overlies the extremity of the part 41, and is, therefore, directly secured to the proximate face of the part 41. The spoke 8, also comprises the separate piece 30 lying wholly in a separate plane from the strip 25, and having a curved inner end 31, which extends across and underlies the part 41, of the spoke 9, so that it intervenes between the latter and the flange 12, being secured, however, by means of the rivets 39. Said part 31, is prolonged so as to extend beyond the line of bifurcation of the spoke, and overlies the corresponding end of the part 51, upon the spoke 10, being secured to the flange 12, by means of the rivet 63. The parts 31, and 41, may also be secured together by the rivet 49, located beyond the periphery of the flange 12. The piece 30, has a straight portion which partly underlies the piece 25, throughout a considerable portion of its length, being secured thereto by means of the rivets 39. The outer end of the piece 30, is secured to the flanges 3, and 4, by means of the rivets 36, and 37.

The spoke member of the spoke 10, is similar in construction to that of the spoke 8, just described, the respective pieces, however, being reversed in position as shown. It comprises the straight piece 52 lying wholly in a different plane, and the piece 50, having a curved inner end 51. The inner end of the straight piece 52, underlies the extremity of the piece 44, (as shown in Fig. III), and is secured to the flange 12, by means of the rivets 61. The curved part 51, overlies the part 44, and extends across it and beyond the line of bifurcation, so as to overlie the end of the piece 31, being secured near its extremity to the flange 12, by means of the rivets 63. The part 51, may also be secured to the part 44, by means of the rivet 54, located beyond the periphery of the flange 12. The outer end of the piece 52, is secured to the flanges 3, and 4, by means of the rivets 59, and 60, and the outer end of the piece 50, is secured to said flanges by means of the rivets 58, and 59. The straight portion of the piece 50, partly overlaps the piece 52, longitudinally, and is secured thereto by means of the rivets 57. In the instance shown, the spoke members may advantageously be constructed of sheet steel, and may have stamped up portions such as 64, and 65, to afford additional stiffness.

It will be noted that the inner ends of the several spoke-member pieces overlap one another in an orderly sequence, and without distortion of the end portions from their respective normal planes, so as to make a uniform distribution of the metal at the region of the hub-shell, thus conducing both to the symmetrical appearance of the pulley and to the uniformity of its structural strength at that region. I do not however, desire it to be understood that my claims are limited in the particular relative location of the overlapping inner ends of the spoke-member pieces, and while the organization above described relates particularly to a split pulley and is well adapted thereto, it is obvious that not only can the arrangement be varied in that particular type of structure, but should be appropriately varied for maintaining a complete orderly sequence in the case of a "whole pulley", or similar structure. Furthermore, it will be understood that while I consider the best embodiment of my invention for the purpose of a pulley to be one in which each spoke comprises duplicate spoke-members, divergent at their inner extremities, and converging toward a common region of attachment of the rim, such method of construction is not essential, and in my broader claims I shall refer to the spoke-members without restriction to this duplicated feature.

As will be noted from the above reference to my own prior patent, I do not broadly claim herein the use of spokes having overlapping inner end portions, nor do I broadly claim the construction of the spoke members from two separate pieces of metal riveted together. The special features of my present invention reside in the arrangement of the spoke pieces in wholly different planes overlapping one another and having their ends underlying and overlying one another at the region of attachment to the hub shell, which is permitted by such distribution of the planes of the respective spoke pieces.

I claim:—

1. In a wheel structure, the combination with a rim and a flanged hub, of a spoke formed of parallel, straight, overlapped pieces secured at their outer ends to the rim and diverging at their inner hub ends in parallel planes, and similarly constructed spokes at opposite sides of the first named spoke, the inner ends of the first named spoke respectively underlying the ends of one member or piece of each of the other spokes and overlying the ends of the other members of said other spokes.

2. In a split-pulley, the combination of, a rim segment; a semi-cylindrical hub provided with a projecting flange; a spoke-member comprising a pair of separate pieces having, respectively, straight portions which lie in different planes and overlap one another longitudinally, and having also oppositely curved inner end portions; means for securing said inner end portions to the hub-flange; a plurality of spoke-members, arranged on either side of the first mentioned spoke-member, and each comprising a straight piece, and a separate piece lying in a different plane, and having a straight portion and a curved inner end portion, the respective straight portions overlapping one another longitudinally, and the respective curved inner end portions being arranged in overlapping relation to the curved inner end portions of the intermediate spoke-member; means for securing the inner ends of said last mentioned pieces to the hub-flange; and means for securing the outer ends of said spoke-members to the rim.

3. In a split-pulley, the combination of a rim segment; a semi-cylindrical hub, provided with a projecting flange; a spoke-member comprising a pair of separate pieces, having respectively straight portions, which lie in different planes, and overlap one another longitudinally, and having also oppositely curved inner end portions, said inner end portions being extended to substantially the diametrical borders of the hub flange; means for securing said inner end portions to the hub flange; a plurality of spoke-members arranged on either side of the first mentioned spoke-member, and each comprising a straight piece, and a separate piece, lying in a different plane, and having a straight portion and a curved inner end portion, the respective straight portions overlapping one another longitudinally, and the respective curved inner end portions being arranged in overlapping relation to the curved inner end portions of the intermediate spoke-member, and being also prolonged to overlap one another at their extremities; means for securing the inner ends of the respective spoke pieces to the hub flange; and means for securing their outer ends to the rim.

In testimony whereof, I have hereunto signed my name at Philadelphia, Pennsylvania, this second day of March 1911.

RUSSELL H. BOWEN.

Witnesses:
JAMES H. BELL,
E. L. FULLERTON.

---

Copies of this patent may be obtained for five cents each, by addressing the "Commissioner of Patents, Washington, D. C."